US012675239B2

(12) United States Patent
Xiong et al.

(10) Patent No.: US 12,675,239 B2
(45) Date of Patent: Jul. 7, 2026

(54) MEMORY SYSTEMS, MEMORY CONTROLLERS, CONTROL METHODS, AND STORAGE MEDIUMS TO INCREASE UTILIZATION OF RESOURCES BY MULTIPLE COMMANDS

(71) Applicant: Yangtze Memory Technologies Co., Ltd., Hubei (CN)

(72) Inventors: Tao Xiong, Wuhan (CN); Xuqing Jia, Wuhan (CN); Zhuangfei Qian, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/800,905

(22) Filed: Aug. 12, 2024

(65) Prior Publication Data

US 2025/0328287 A1     Oct. 23, 2025

(30) Foreign Application Priority Data

Apr. 22, 2024    (CN) .......................... 202410492258.1

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC ..... G06F 3/0659; G06F 3/0613; G06F 3/0679
See application file for complete search history.

(56) References Cited

U.S. PATENT DOCUMENTS

2022/0382486 A1* 12/2022 Kim ........................ G06F 3/061
2024/0231702 A1*  7/2024 Cariello ................ G06F 3/0604

* cited by examiner

*Primary Examiner* — Jane W Benner
(74) *Attorney, Agent, or Firm* — Hanley, Flight & Zimmerman, LLC

(57) ABSTRACT

Examples of the present disclosure provide a memory system, a memory controller, a control method, and a storage medium. The method includes: sending a first command phase of a first command, sending a second command in idle time of the first command, and sending a second command phase of the first command when the idle time of the first command expires.

20 Claims, 13 Drawing Sheets

<u>100</u>

S310

Acquire a first command to be sent

S320

Determine whether a command occupancy time of the first
command to be sent is less than a first time threshold

S330

Determine that the first command to be sent is the second command
in response to the command occupancy time of the first
command to be sent being less than the first time threshold

S410

Start timing upon completion of sending the first
command phase of the first command

S420

Send the second command during the timing

S430

Send the second command phase of the first command when time
of the timing reaches the idle time of the first command

S510

Acquire a second command to be sent

S520

Determine whether an idle time of the second command to be sent is greater than a second time threshold

S530

Determine that the second command to be sent is the first command in response to the idle time of the second command to be sent being greater than the second time threshold

MEMORY SYSTEMS, MEMORY CONTROLLERS, CONTROL METHODS, AND STORAGE MEDIUMS TO INCREASE UTILIZATION OF RESOURCES BY MULTIPLE COMMANDS

CROSS-REFERENCE TO RELATED APPLICATION

This application claims priority to and the benefit of Chinese Patent Application 202410492258.1, filed on Apr. 22, 2024, which is hereby incorporated by reference in its entirety.

TECHNICAL FIELD

The present disclosure relates to the field of semiconductor technology, and particularly to memory systems, memory controllers, control methods, and storage mediums.

BACKGROUND

In a memory system, a memory controller is connected with a memory device through a bus. The bus is responsible for transmitting a control command, address information, and read and write data between the memory controller and the memory device.

BRIEF DESCRIPTION OF THE DRAWINGS

The accompanying drawing herein are incorporated into the specification to constitute a part of the specification, illustrate examples conforming to the present disclosure, and are used to explain the principle of the present disclosure together with the specification. Apparently, the drawings described below are merely some examples of the present disclosure. Those skilled in the art may obtain other drawings according to such drawings without creative work.

It is to be understood that the following detailed description is merely explanatory and does not limit the present disclosure.

DETAILED DESCRIPTION

Figure 1A:
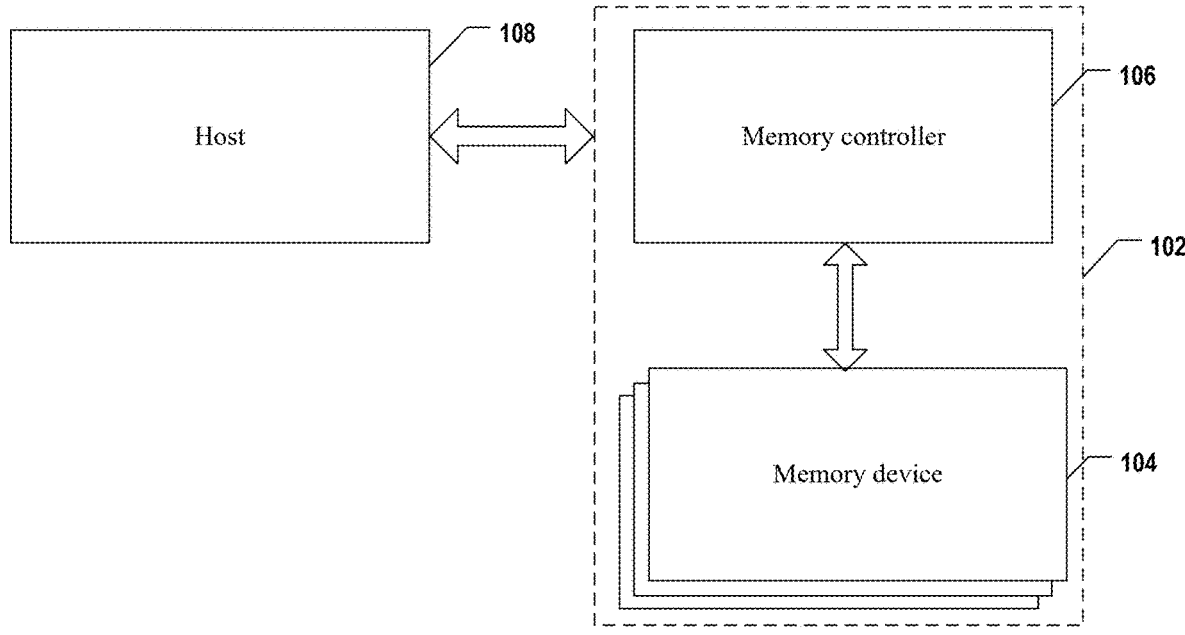
FIG. 1A is a schematic diagram of an example system having a memory system according to an example of the present disclosure.

Examples are described more comprehensively with reference to the drawings. However, the examples can be implemented in various forms and should not be construed as being limited to examples set forth herein. In contrast, these examples are provided for a thorough and complete understanding of the present disclosure, and to fully convey the concept of the examples to a person skilled in the art. Same reference numerals in the drawings denote same or like parts, and thus repeated descriptions thereof are omitted.

The features, structures or characteristics described in the present disclosure may be combined in one or more implementations in any proper manner. In the following description, many specific details are provided thereby giving a full understanding of the implementations of the present disclosure. However, those skilled in the art will realize that the technical solutions of the present disclosure may be practiced and one or more of the particular details may be omitted, or other methods, elements, devices, operations, etc., may be employed. In other cases, well-known methods, devices, implementations, or operations are not shown or described in detail to avoid obscuring aspects of the present disclosure.

The accompanying drawings are merely schematic illustrations of the present disclosure, in which same reference numerals denote same or like parts, and thus repeated descriptions thereof are omitted. Some block diagrams shown in the drawings do not necessarily correspond to physically or logically separate entities. These functional entities may be implemented in a software form, or implemented in at least one hardware module or integrated circuit, or implemented in different networks and/or processor devices and/or microcontroller devices.

The flow diagrams in the accompanying drawings are merely example illustrations that do not necessarily comprise all the contents and operations, nor are they necessarily executed in a described order. For example, some operations may be divided, and some operations may be combined or partially combined, so that an actual order of execution may change depending on actual situations.

In the specification, the terms "one", "a", "the", "said" and "at least one" are used to indicate the presence of at least one element/constituent part/etc.; the terms "comprise", "include" and "have" are used to indicate open inclusion and mean that there may be other elements/components/etc., in addition to those listed elements/components/etc.; and the terms "first", "second" and "third", etc. are used only as labels instead of limitations to the amounts of objects.

As the data transmission rate in the memory system increases continuously, the demand for the transmission rate on the bus increases accordingly. However, based on the requirement of a relevant standard protocol, a timing related to the command transmitted on the bus does not become shorter correspondingly. This causes the efficiency of transmitting the command on the bus to decrease as the data transmission rate in the memory system increases continuously. Therefore, there is room for further improvement in the efficiency of transmitting the command on the bus.

FIG. 1A is a schematic diagram of an example system having a memory system according to an example of the present disclosure. The system 100 may be a mobile phone, a desktop computer, a laptop computer, a tablet computer, a vehicle computer, a game console, a printer, a positioning device, a wearable electronic device, a smart sensor, a Virtual Reality (VR) device, an Augmented Reality (AR) device or any other suitable electronic devices having storage therein. As shown in FIG. 1A, the system 100 may comprise a host 108 and a memory system 102 having one or more memory devices 104 and a memory controller 106.

The host 108 may be a processor (e.g., a Central Processing Unit (CPU)) or a System on a Chip (SoC) (e.g., an Application Processor (AP)) of an electronic device. The host 108 may be coupled to the memory controller 106 and configured to send or receive data to or from the memory device 104 through the memory controller 106. For example, the host 108 may send program data during a program operation or receive read data during a read operation. The host 108 is configured to receive and send instructions and commands from and to the memory controller 106 of the memory system 102, and perform or implement a plurality of functions and operations provided in the present disclosure, which will be described below.

The memory device 104 may be any memory device disclosed in the present disclosure, e.g., a NAND flash memory device, which comprises a page buffer having a plurality of portions. It is to be noted that for illustrative purposes, a NAND flash is merely an example of the memory device. The memory device 104 may include any suitable non-volatile memory, such as a NOR flash, a Ferroelectric Random Access Memory (FeRAM), a Phase Change Memory (PCM), a Magnetic Random Access Memory (MRAM), a Spin-Transfer Torque Random Access Memory (STT-RAM), or a Resistive Random Access Memory (RRAM). In some implementations, the memory device 104 comprises a three-dimensional (3D) NAND flash memory.

The memory controller 106 may be implemented through the following: a microprocessor, a microcontroller (also referred to as Microcontroller Unit (MCU)), a Digital Signal Processor (DSP), an Application Specific Integrated Circuit (ASIC), a Field-Programmable Gate Array (FPGA), a Programmable Logic Device (PLD), a state machine, a gated logic, a discrete hardware circuit, and other suitable hardware, firmware and/or software configured to perform various functions described in detail below.

According to some implementations, the memory controller 106 is coupled to the memory device 104 and the host 108, and configured to control the memory device 104. The memory controller 106 can manage data stored in the memory device 104 and communicate with the host 108. In some implementations, the memory controller 106 is designed for operating in a low duty-cycle environment such as a Secure Digital (SD) card, a Compact Flash (CF) card, a Universal Serial Bus (USB) flash drive, or other media for use in electronic devices (such as a personal computer, a digital camera, and a mobile phone). In some implementations, the memory controller 106 is designed for operating in a high duty-cycle environment SSD or an embedded MultiMedia Card (eMMC) that is used as a data storage for a mobile apparatus (such as a smartphone, a tablet computer, and a laptop computer) and an enterprise memory array. The memory controller 106 may be configured to control operations of the memory device 104, such as read, erase, and program operations, by providing instructions such as a read instruction to the memory device 104 For example, the memory controller 106 may be configured to provide the read instruction to a peripheral circuit of the memory device 104 to control the read operation. The memory controller 106 may be further configured to manage various functions with respect to data stored or to be stored in the memory device 104, including, but not limited to, bad block management, Garbage Collection (GC), logical-to-physical address conversion, and wear leveling, etc. In some implementations, the memory controller 106 is further configured to process an Error Correcting Code (ECC) with respect to data read from or written to the memory device 104. The memory controller 106 may also perform any other suitable functions, e.g., formatting the memory device 104.

The memory controller 106 may communicate with an external device (e.g., the host 108) according to a particular communication protocol. For example, the memory controller 106 may communicate with the external device through at least one of various interface protocols, such as a USB protocol, a Multi Media Card (MMC) protocol, a Peripheral Component Interconnect (PCI) protocol, a Peripheral Component Interconnect Express (PCI-Express, PCI-E) protocol, an Advanced Technology Attachment (ATA) protocol, a serial ATA protocol, a parallel ATA protocol, a Small Computer System Interface (SCSI) protocol, an Enhanced Small Drive Interface (ESDI) protocol, an Integrated Drive Electronics (IDE) protocol, and a Firewire protocol.

The memory controller 106 and one or more memory devices 104 can be integrated into various types of storage devices, e.g., be included in the same package (such as a Universal Flash Storage (UFS) package or an eMMC package). That is, the memory system 102 may be implemented and packaged into different types of end electronic products.

Figure 1B:
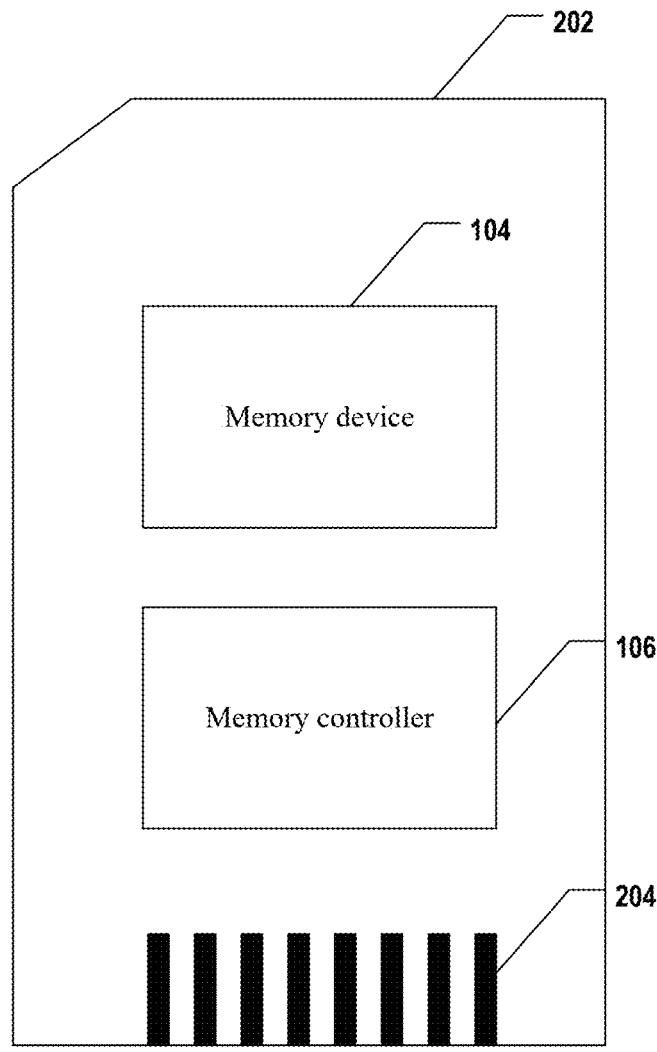
FIG. 1B is a schematic diagram of an example memory card having a memory system according to an example of the present disclosure.

In one example as shown in FIG. 1B, the memory controller 106 and the memory device 104 may be integrated into a memory card 202. The memory card 202 may include a PC (Personal Computer Memory Card International Association (PCMCIA)) card, a CF card, a Smart Media (SM) card, a memory stick, a Multi Media Card (MMC), an SD card, and a UFS, etc. The memory card 202 may further comprise a memory card connector 204 coupling the memory card with a host (e.g., the host 108 in FIG. 1).

Figure 1C:
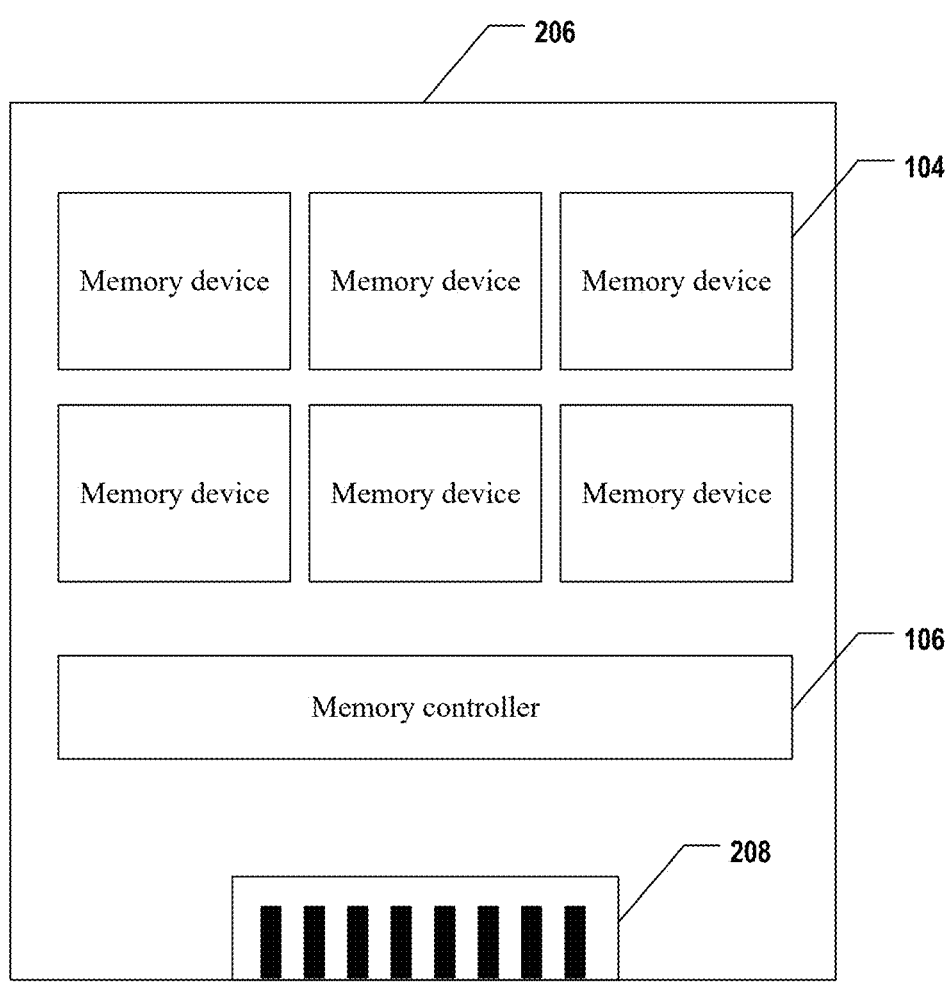
FIG. 1C is a schematic diagram of an example solid state drive having a memory system according to an example of the present disclosure.

In another example as shown in FIG. 1C, the memory controller 106 and a plurality of memory devices 104 may be integrated into a solid state drive 206. The solid state drive 206 may further comprise a solid state drive connector 208 coupling the solid state drive 206 with a host (e.g., the host 108 in FIG. 1A). In some implementations, at least one of a storage capacity or an operation speed of the solid state drive 206 is greater than that of the memory card 202.

Figure 1D:
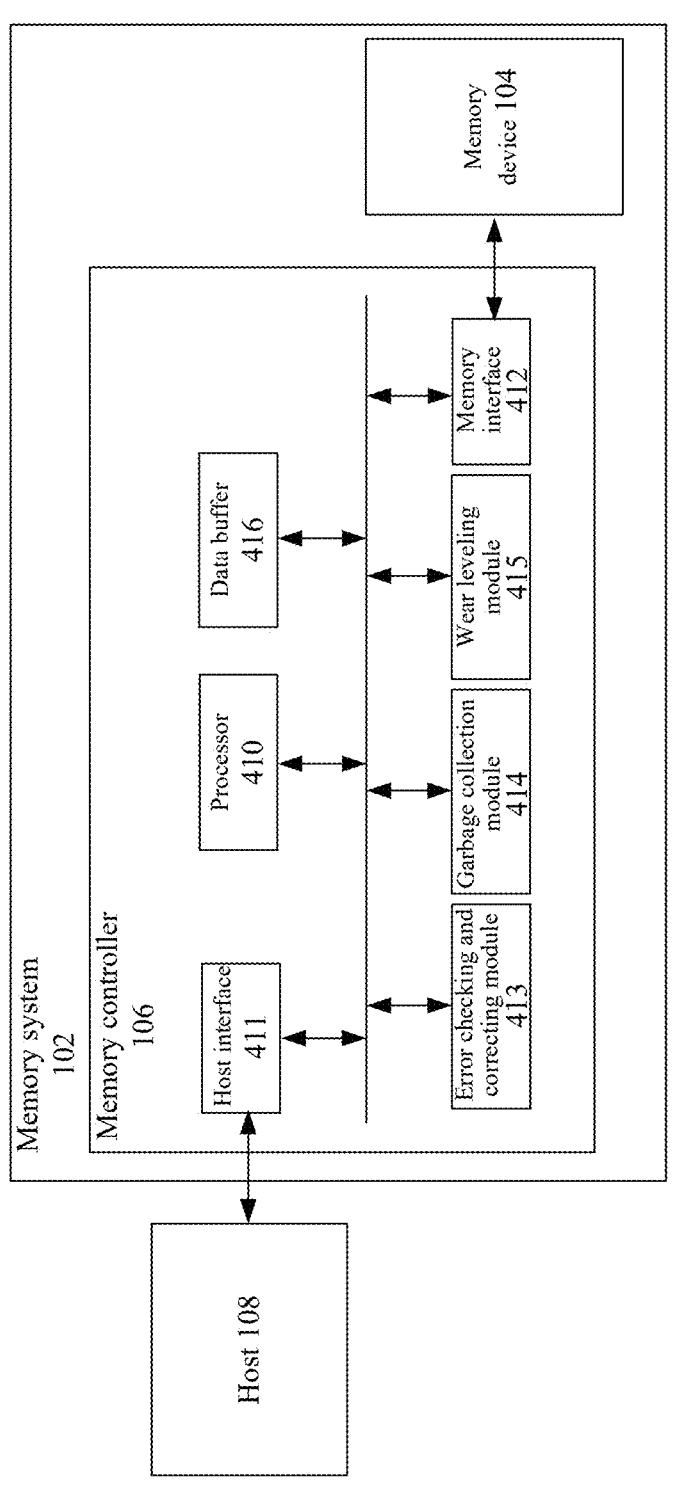
FIG. 1D is a schematic diagram of an example memory system having a memory controller according to an example of the present disclosure.

FIG. 1D is a schematic diagram of an example memory controller having a memory system according to an example of the present disclosure. As shown in FIG. 1D, the memory controller 106 is respectively connected with the host 108 and one or more memory devices 104 by coupling, for control of sending data from the host 108 to the memory device 104 or reading data from the memory device 104 to the host 108. The memory controller 106 comprises at least: a processor 410, a host interface 411, a memory interface 412, an error checking and correcting module 413, a garbage collection module 414, a wear leveling module 415, and a data buffer 416.

The processor 410, which is a core part of the memory controller, is configured to execute a control logic and an algorithm of the memory controller and responsible for handling functions such as command queuing, address mapping, garbage collection, data compression, and input/output control. The processor 410 may be implemented through an embedded processor or FPGA.

The host interface 411, which is coupled with the host 108 and the processor 410 respectively, is a communication interface component between the host and the memory controller and is responsible for data transmissions between the host and the memory controller, including reading and writing of data, and receiving and sending of commands. The host interface typically supports various interfaces (e.g., Serial Advanced Technology Attachment (SATA), and PCIe) and protocols (e.g., Advanced Host Controller Interface (AHCI), and Non-Volatile Memory Express (NVMe)), and provides the data transmission function.

The memory interface 412, which is coupled with the memory device 104 and the processor 410 respectively, is a communication interface component between the memory device and the memory controller and is responsible for realizing functions such as reading and writing of data, erasing, and address mapping.

The Error Checking and Correcting (ECC) module 413, which is coupled with the processor 410, is configured to perform error checking and correcting protection for data integrity. The ECC module adds particular redundancy check information when writing data, and performs decoding and checking when reading data, thus automatically correcting possible bit errors, and thereby improving data reliability.

The Garbage Collection (GC) module 414, which is coupled with the processor 410, is configured to release an invalid or updated data block. The GC module migrates valid data on a data block to other data blocks, so as to erase and reuse the data block.

This Wear Leveling (WL) module 415, which is coupled with the processor 410, is configured to level the number of erase of respective data blocks.

The data buffer 416, which is coupled with the processor 410, is a component for storing data temporarily and may also be configured to buffer instructions and data. The data buffer typically employs a high-speed memory device, such as a Dynamic Random-Access Memory (DRAM), and a Static Random-Access Memory (SRAM), so as to improve read write performance of the memory controller and reduce a latency.

The memory controller 106 is configured to receive a command from the host 108 and send a command to the memory device 104, and perform or implement a plurality of functions and operations provided in the present disclosure, which will be described below.

Figure 1E:
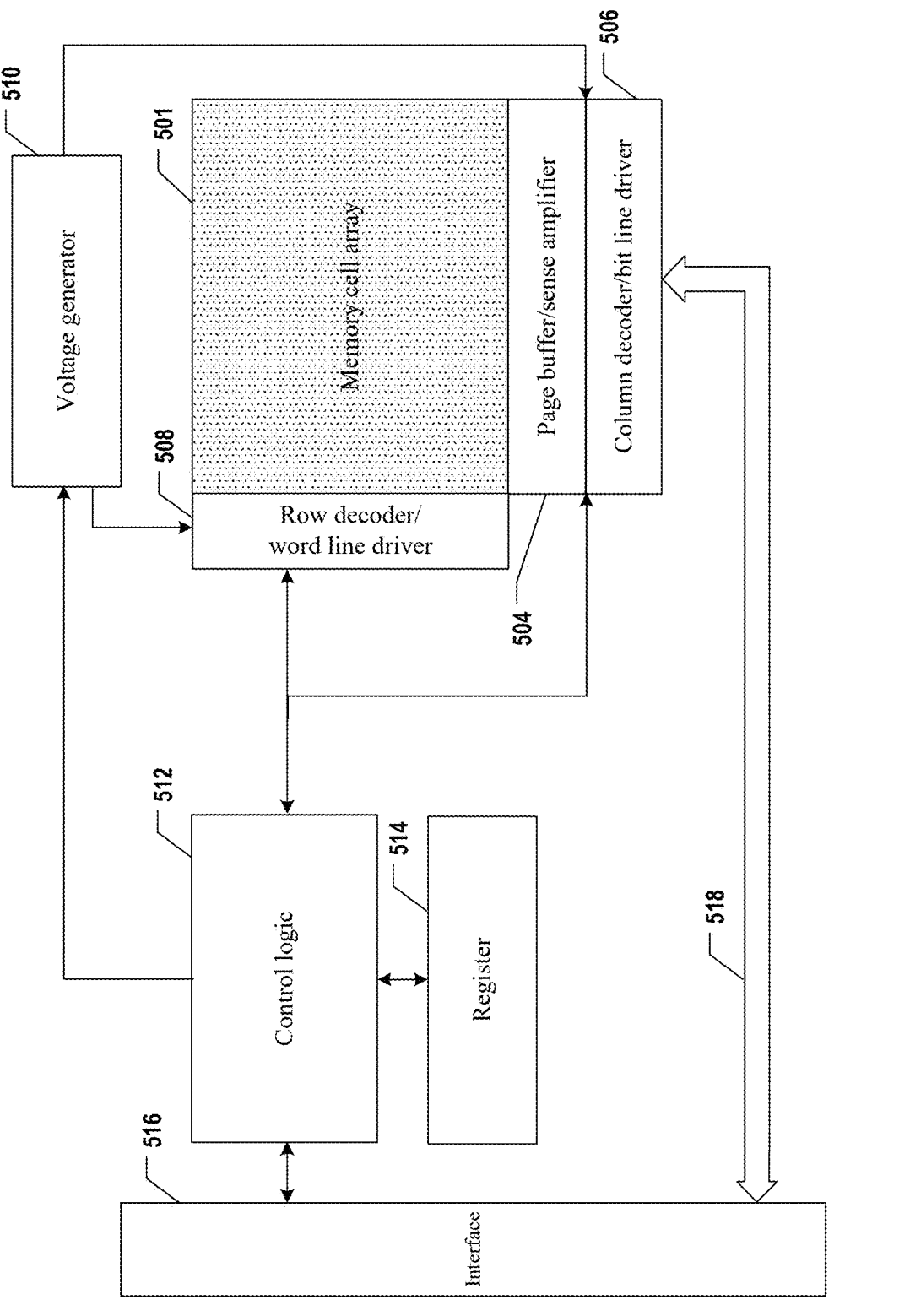
FIG. 1E is a schematic diagram of an example memory device comprising a memory cell array and a peripheral circuit according to an example of the present disclosure.

FIG. 1E is a schematic diagram of an example memory device comprising a memory cell array and a peripheral circuit according to an example of the present disclosure. As shown in FIG. 1E, the memory device 104 may comprise a memory cell array 501 and a peripheral circuit coupled to the memory cell array 501. The peripheral circuit may comprise: a page buffer/sense amplifier 504, a column decoder/bit line driver 506, a row decoder/word line driver 508, a voltage generator 510, a control logic 512, a register 514, an interface 516, and a data bus 518. It is to be understood that in some examples, additional peripheral circuits not shown in FIG. 1E may be included as well.

The page buffer/sense amplifier 504 may be configured to read and program (write) data from and to the memory cell array 501 according to control signals from the control logic 512. In one example, the page buffer/sense amplifier 504 may store one page of program data (write data) to be programmed into the memory cell array 501. In another example, the page buffer/sense amplifier 504 may perform a program verify operation to ensure that data has been properly programmed into memory cells of a selected word line. In still another example, the page buffer/sense amplifier 504 may also sense a low power signal from a bit line that represents a data bit stored in the memory cell, and amplify a small voltage swing to a recognizable logic level in a read operation.

The column decoder/bit line driver 506 may be configured to be controlled by the control logic 512 and select one or more NAND memory strings by applying bit line voltages generated from the voltage generator 510. Data input from the data bus 518 is directed (routed) to a desired memory cell region (e.g., a group) of the memory cell array 501, and data output from the desired memory cell region is directed (routed) to the data bus 518.

The row decoder/word line driver 508 may be configured to be controlled by the control logic 512 and a selected block and a word line of the selected block of the memory cell array 501. The row decoder/word line driver 508 may be further configured to drive the selected word line using a word line voltage generated from the voltage generator 510. The voltage generator 510 may be configured to be controlled by the control logic 512, and generate the word line voltage (such as a read voltage, a program voltage, a pass voltage, a local voltage, and a verify voltage) to be supplied to the memory cell array 501.

The control logic 512 may be coupled to each of the peripheral circuit described above and configured to control operations of each peripheral circuit. The register 514 may be coupled to the control logic 512 and comprise a status register, a command register, and an address register configured to store status information, a command operation code, and a command address for controlling the operations of each peripheral circuit. The interface 516 may be coupled to the control logic 512, and act as a control buffer to buffer and relay a control command received from the host to the control logic 512 and buffer and relay status information received from the control logic 512 to the host. The interface 516 may also be coupled to the column decoder/bit line driver 506 through the data bus 518 and act as a data interface and a data buffer to buffer and relay written data received from a host (not shown) to the memory cell array 501 or buffer and relay data from the memory cell array 501.

Figure 1F:
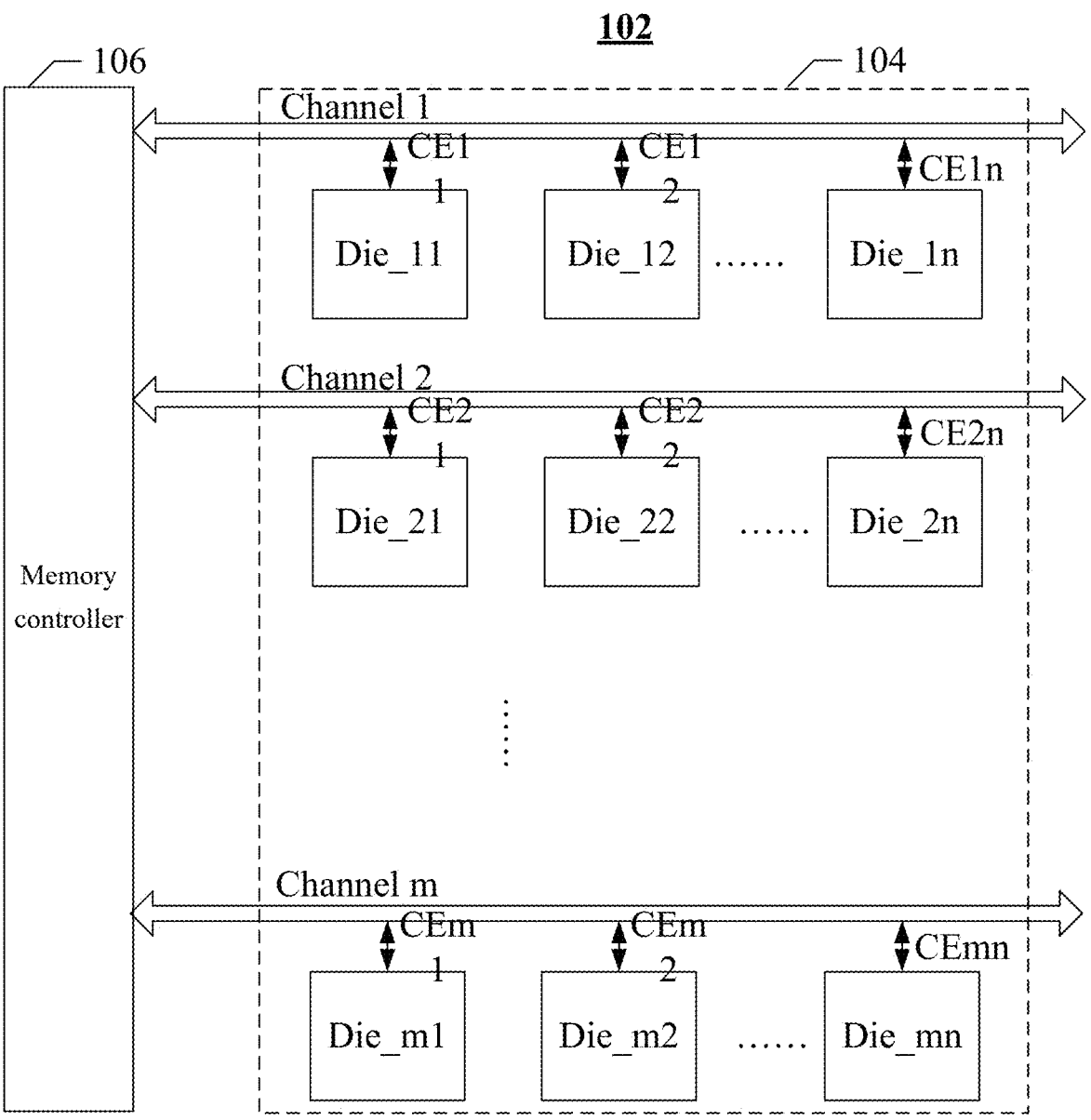
FIG. 1F is a schematic diagram of an example memory device architecture having a memory system according to an example of the present disclosure.

FIG. 1F is a schematic diagram of an example memory device architecture having a memory system according to an example of the present disclosure. As shown in FIG. 1F, the memory system 102 is provided with the one or more memory devices 104 and the memory controller 106.

The memory controller 106 is connected with the one or more memory devices 104 by coupling through a plurality of physical channels, so as to send a control command or transmit data to the memory device 104. The memory device 104 comprises one or more logic cells (Die, also referred to as LUN). The logic cell is a basic memory unit in the memory device 104. One or more logic cells are connected on each physical channel. Each logic cell corresponds to a respective enable signal (e.g., Chip Enable (CE)).

The control command sent by the memory controller 106 to the memory device 104 comprises the enable signal, by which a corresponding logic cell in the physical channel is gated, that is, a target logic cell of the control command is selected.

Figure 2:
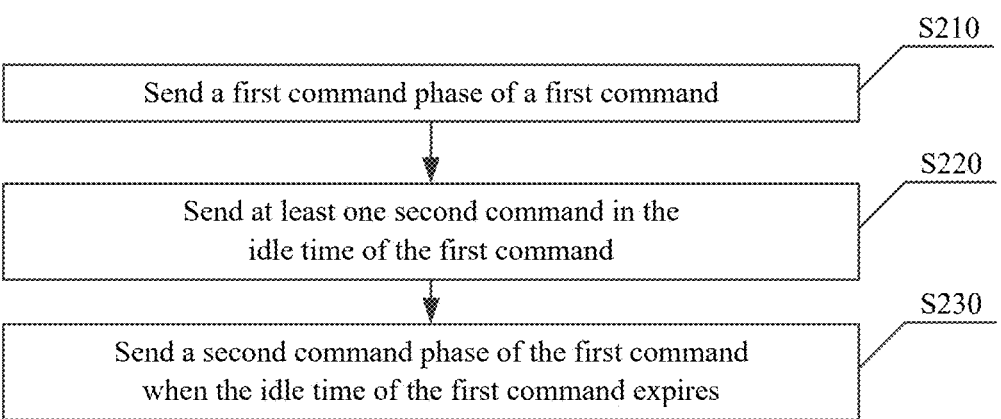
FIG. 2 is a schematic flow diagram of a control method of a memory system according to an example of the present disclosure.

FIG. 2 is a schematic flow diagram of a control method of a memory system according to an example of the present disclosure. As shown in FIG. 2, the control method of a memory system provided in the example of the present disclosure is applicable to the memory controller shown in FIG. 1A, 1B, or 1C.

The control method of an example of the present disclosure may comprise S210. In S210, a first command phase of a first command is sent, wherein the first command comprises the first command phase and a second command phase with an idle time provided between the first command phase and the second command phase.

In the memory system shown in FIG. 1A, the memory controller 106 is connected with the memory device 104 through the bus. The bus is responsible for transmitting a control command, address information, and read and write data between the memory controller and the memory device. A process of transmitting the control command on the bus needs to conform to relevant protocol regulations in the industry, such as an Open NAND Flash Interface (ONFI) protocol. The ONFI protocol is developed by the ONFI workgroup to define a specification for a communication interface between the memory device and the memory controller. In the ONFI protocol, the control command is realized by combination based on basic instructions, such as an address latch instruction, a command latch instruction, a data input instruction, and a data output instruction. The address latch instruction is used to send to the memory device at least one of a row address or a column address of a memory cell to be operated. The command latch instruction is used to send to the memory device a command code of an operation instruction. The data input instruction and the data output instruction are used to transmit a data stream being input to or output from the memory device.

As stipulated by the ONFI protocol, the command comprises a first command phase (NAND CMD Phase) and a second command phase. The first command phase and the second command phase are a segment of consecutive command instructions respectively, which needs to occupy transmission resources of the bus. In an example of the present disclosure, the first command phase of the first command is sent first. The idle time stipulated by the ONFI protocol is provided necessarily between the first command phase and the second command phase. A series of instruction operations, such as data reading, data programming, and data erasing, on the memory device may be realized only when the timing specifications for address transmission, command transmission, and data transmission as required by the ONFI protocol are met.

Figure 7A:
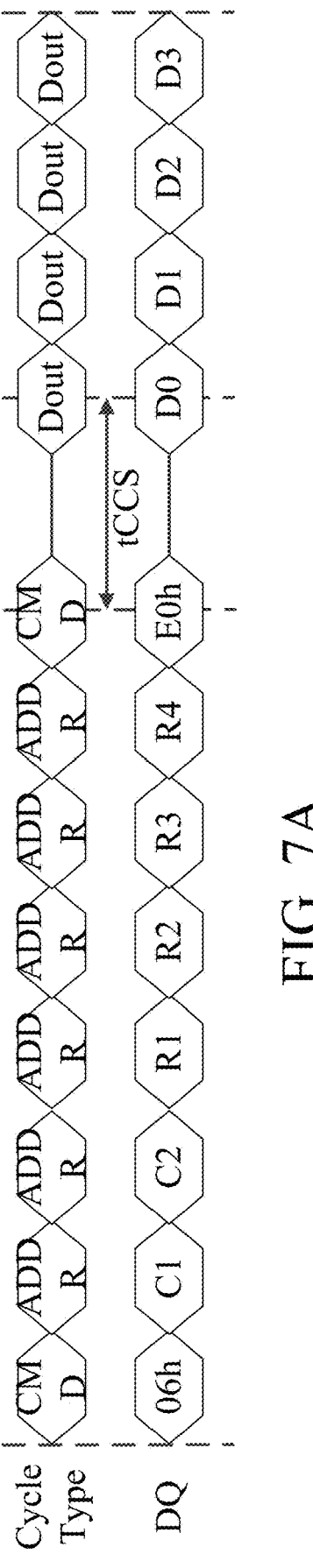
FIG. 7A is an example timing diagram of a command according to an example of the present disclosure.

In examples, FIG. 7A is an example timing diagram of a command according to an example of the present disclosure. As shown in FIG. 7A, a command code 06h and a command code E0h of the command latch instruction are transmitted to the memory device in the timing of the command. The command code 06h indicates that the command is a change read column command. Between command codes 06h and E0h, the transmission address latch instruction comprises column addresses C1 and C2 and row addresses R1, R2, R3, and R4, which are used to denote the addresses of the memory cells to be operated. As stipulated by the ONFI protocol, the command cannot execute the timing of data output until a specified time interval after transmitting the command latch instruction and the address latch instruction. The time interval varies according to different command types. For the change read column command, the ONFI protocol stipulates that the interval is required to be a change column setup time (tCCS). In the example, the change column setup time tCCS is stipulated as being 300 ns. As shown in FIG. 7A, the data output instructions comprising data D1, D2, D3, and D4 are output sequentially in the timing of the command after an interval of the change column setup time tCCS. The first command phase of the command is constituted by the command latch instruction and the address latch instruction, and the second command phase of the command is constituted by the data output instructions. The necessary time interval, i.e., the change column setup time tCCS, between the first command phase and the second command phase that is stipulated based on the ONFI protocol, is the idle time of the command. Occupied time that is required to send the command, comprising the first command phase, the second command phase, and the idle time, is occupancy time of the command.

Figure 7B:
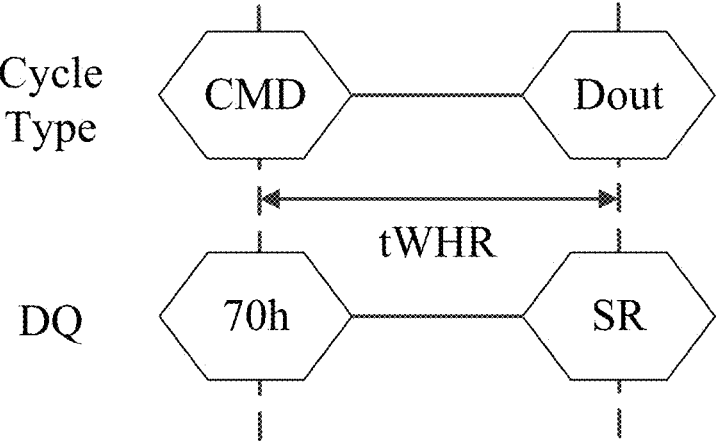
FIG. 7B is an example timing diagram of a command according to another example of the present disclosure.

In examples, FIG. 7B is an example timing diagram of a command according to another example of the present disclosure. As shown in FIG. 7B, a command code 70h of the command latch instruction is transmitted to the memory device in the timing of the command. The command code 70h indicates that the command is a status read command. As stipulated by the ONFI protocol, the command cannot execute the timing of data output until an interval of write hold recovery time (tWHR) after transmitting the command latch instruction. In the example, the write hold recovery time tWHR is stipulated as being 80 ns. As shown in FIG. 7B, a data output instruction comprising data SR is output in the timing of the command after an interval of the write hold recovery time tWHR. The first command phase of the command is constituted by the command latch instruction, and the second command phase of the command is constituted by the data output instruction. The necessary time interval, i.e., the write hold recovery time tWHR, between the first command phase and the second command phase that is stipulated based on the ONFI protocol, is the idle time of the command. Occupied time that is required to send the command, comprising the first command phase, the second command phase, and the idle time, is occupancy time of the command.

It can be seen that, as stipulated by the ONFI protocol, the command must have an interval of a preset idle time between the first and second command phases. However, the corresponding idle time and command occupancy time vary according to different command types.

The control method of an example of the present disclosure may comprise S220. In S220, a second command is sent in the idle time of the first command.

In the example of the present disclosure, the second command is sent in the idle time of the first command. As described above, as stipulated by the ONFI protocol, the interval of the idle time is necessarily provided between the first command phase and the second command phase. The idle time is waiting time for the second command phase, during which the bus is not occupied to send a command instruction, causing a waste of bus resources and thereby affecting the efficiency of transmitting commands on the bus. Accordingly, in the example of the present disclosure, the idle time of the first command is used for sending the second command, so as to improve the utilization of the bus resources.

In the example of the present disclosure, the command occupancy time corresponding to the second command is less than the idle time of the first command, so as to ensure that a transmission of the second command is completed prior to a transmission of the second command phase of the first command. As such, the normal sending of the first command may not be affected. Meanwhile, a time period should be reserved between adjacent command instructions between the first command and the second command for level recovery, and therefore the command occupancy time of the second command should be less than the idle time of the first command.

In the examples, the first command is the change read column command shown in FIG. 7A, and the second command is the status read command shown in FIG. 7B. As described above, the idle time of the change read column command is the change column setup time tCCS, i.e., 300 ns. The command occupancy time of the second command comprises a command latch instruction transmission time, a write hold recovery time tWHR, and a data output instruction transmission time, i.e., being slightly greater than 80 ns. As can be seen, the command occupancy time of the second command is less than the idle time of the first command, and the second command may be sent in the idle time, i.e., the change column setup time tCCS, of the first command.

The control method of an example of the present disclosure may comprise S230. In S230, the second command phase of the first command is sent when the idle time of the first command expires.

In the example of the present disclosure, the second command sent using the idle time of the first command in S220 does not affect the sending of the first command. Therefore, as stipulated by the ONFI protocol, the second command phase of the first command is sent when the idle time of the first command expires, so as to complete the transmission of the first command.

In the control method provided by the example of the present disclosure, the first command phase of the first command is sent, the second command is sent in the idle time of the first command, and the second command phase of the first command is sent when the idle time of the first command expires. In the method, the idle time between the first command phase and the second command phase of the first command is used for sending the second command, thereby improving the transmission efficiency of the bus while ensuring the normal transmission of the first command.

In the control method of an example of the present disclosure, the second command may be determined based on a comparison between a command occupancy time of a command to be sent and the idle time of the first command.

Figure 3:
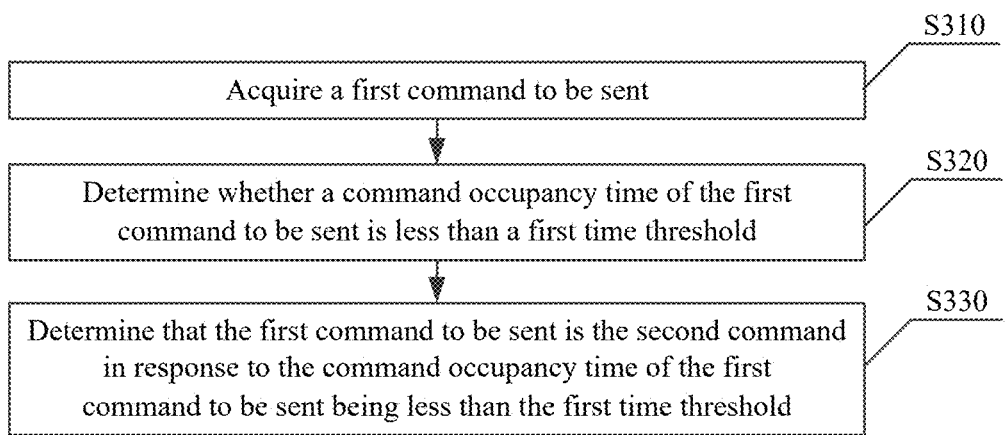
FIG. 3 is a schematic flow diagram of a method for determining a second command according to an example of the present disclosure.

FIG. 3 is a schematic flow diagram of a method for determining the second command according to an example of the present disclosure. As shown, the method for determining the second command may comprise the following operations. It is applicable to the memory controller shown in FIG. 1A.

The control method of the example of the present disclosure may comprise S310. In S310, a first command to be sent is acquired.

In the example of the present disclosure, when receiving a data read write request sent by the host, the memory controller generates respective memory device-oriented commands and collects them into a command pool to be sent in accordance with a certain processing rule. The memory controller arranges an order of transmitting the commands in accordance with factors such as a preset timing, priorities, and bus utilization.

In the example of the present disclosure, when the sending of the second command is required to be inserted into the idle time of the first command as described in S220, the first command to be sent is acquired from the command pool to be sent, so as to determine whether the first command to be sent can be sent as the second command for sending in the idle time of the first command. The first command to be sent may be any command in the command pool.

The control method of the example of the present disclosure may comprise S320. In S320, whether a command occupancy time of the first command to be sent is less than a first time threshold is determined, wherein the first time threshold is less than or equal to the idle time of the first command.

In the example of the present disclosure, the command occupancy time of the first command to be sent is determined according to a command type of the first command to be sent. Since transmission time for a command instruction in a command is short, an empirical duration may be added to idle time of the command as an estimate value of occupancy time of the command.

In the example of the present disclosure, whether the command occupancy time of the first command to be sent is less than the first time threshold is determined. The first time threshold may be the idle time of the first command, or may be a time threshold less than the idle time of the first command, so as to ensure that a time period is reserved between adjacent command instructions between the first command and the second command for level recovery.

The control method of the example of the present disclosure may comprise S330. In S330, it is determined that the first command to be sent is the second command in response to the command occupancy time of the first command to be sent being less than the first time threshold.

In the example of the present disclosure, it is determined that the first command to be sent is the above described second command in response to the command occupancy time of the first command to be sent being less than the first time threshold. Since the command occupancy time of the first command to be sent is less than the idle time of the first command, the sending of the first command to be sent in the idle time of the first command does not affect the sending of the first command. In this regard, the first command to be sent may serve as the second command for the first command, so as to complete the sending of the command in the idle time of the first command.

In the control method of the example of the present disclosure, the second command may be determined based on a command type of the command to be sent. In an example, the second command is a status read command. When the sending of the second command is required to be inserted into the idle time of the first command as described in S220, the command to be sent with a command type of status read command is acquired from the command pool to be sent and used as the second command. Determining the second command through the command type of the command to be sent may save a process of comparing the command occupancy time of the command to be sent with the idle time of the first command as described above, so that an operation of inserting the second command may be performed more efficiently. The reason for selecting the status read command as the second command is because the command occupancy time of the status read command is short, which is suitable for an operation of inserting a transmission in idle time of various commands. Meanwhile, the status read command has a higher probability of use in the memory system and is applicable to more transmission insertion scenarios, which is advantageous for improving the overall transmission efficiency of the bus. Moreover, the logic of the status read command is simple and is not prone to a nesting problem.

In the control method provided by the example of the present disclosure, the second command may be determined through the comparison between the command occupancy time of the command to be sent and the idle time of the first command or through the command type of the command to be sent. A variety of implementation for determining the second command are provided for different application scenarios. Through the above method, the suitable second command may be selected for transmission in the idle time according to the idle time of the first command. The overall transmission efficiency of the bus is improved while ensuring the normal transmission of the first command.

In the control method of an example of the present disclosure, transmissions of a plurality of commands may be inserted in the idle time of the first command, so as to fully use the idle time period and improve the transmission efficiency of the bus. In an example, the following operations may be included.

A third command is sent in the idle time of the first command, wherein a sum of the command occupancy time corresponding to the second command and the command occupancy time corresponding to the third command is less than the idle time of the first command.

In the example of the present disclosure, a transmission of the third command may also be inserted in the idle time of the first command. The sum of the command occupancy time corresponding to the second command and the command occupancy time corresponding to the third command is less than the idle time of the first command. Accordingly, it is ensured that transmissions of the second command and the third command are completed before the transmission of the second command phase of the first command. As such, the normal sending of the first command may not be affected.

It is to be pointed that the third command and the second command may be of the same type or different types. Meanwhile, "second" and "third" are merely labels for different commands and are not used to represent a transmission timing of the relevant commands.

Additionally, the above example is not intended to limit the insertion of transmissions of two commands, i.e., the second and the third commands, in the idle time of the first command, and transmissions of a plurality of commands may be inserted in the idle time of the first command. It is only required to ensure that a sum of command occupancy time of the plurality of commands to be inserted is less than the idle time of the first command.

In the control method provided by the example of the present disclosure, a plurality of commands may be transmitted in the idle time of the first command, so as to fully utilize the bus resources in idle time and further improve transmission efficiency of the bus.

Figure 4:
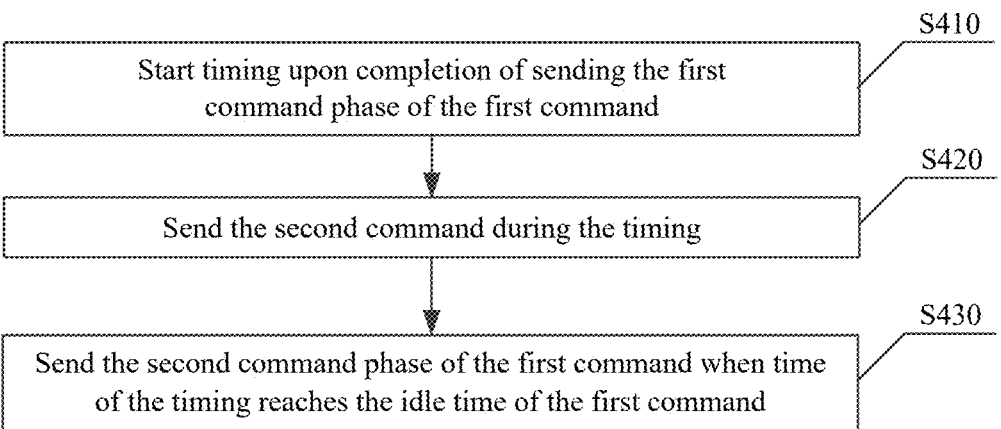
FIG. 4 is a schematic flow diagram of a process for timing an idle time according to an example of the present disclosure.

FIG. 4 is a schematic flow diagram of a process for timing an idle time according to an example of the present disclosure. As shown in the figure, the sending a second command in the idle time of the first command may comprise the following operation. It is applicable to the memory controller shown in FIG. 1A.

The control method of the example of the present disclosure may comprise S410. In S410, a timing is started upon completion of sending the first command phase of the first command.

In the example of the present disclosure, as stipulated by the ONFI protocol, the timing is started upon the completion of sending the first command phase of the first command, so as to timing a duration of the required interval for idle time.

The control method of the example of the present disclosure may comprise S420. In S420, the second command is sent during the timing.

In the example of the present disclosure, during the timing in S410, whether the transmission of the second command is required to be inserted into the idle time is determined according to the type of the first command or the duration of the idle time. When it is determined that the transmission of the second command is required to be inserted into the idle time of the first command, the second command is selected from the command pool to be sent and sent during the timing. The solution of selecting the second command may be selection in accordance with any solution given in the above examples and is no longer repeated here.

In the examples, after the sending of the second command is completed, the third command may be further selected according to remaining time of the timing, from the command pool to be sent, and the third command is sent in the remaining time. As described in the above example, the sum of the command occupancy time corresponding to the second command and the command occupancy time corresponding to the third command is less than the idle time of the first command. The control method of an example of the present disclosure may comprise S430. In S430, the second command phase of the first command is sent when time of the timing reaches the idle time of the first command.

In the example of the present disclosure, as stipulated by the ONFI protocol, the second command phase of the first command is sent when the timing in S410 reaches the idle time of the first command, so as to complete the transmission of the first command.

In the control method of the example of the present disclosure, the first command may be determined based on a duration of idle time of the command to be sent.

Figure 5:
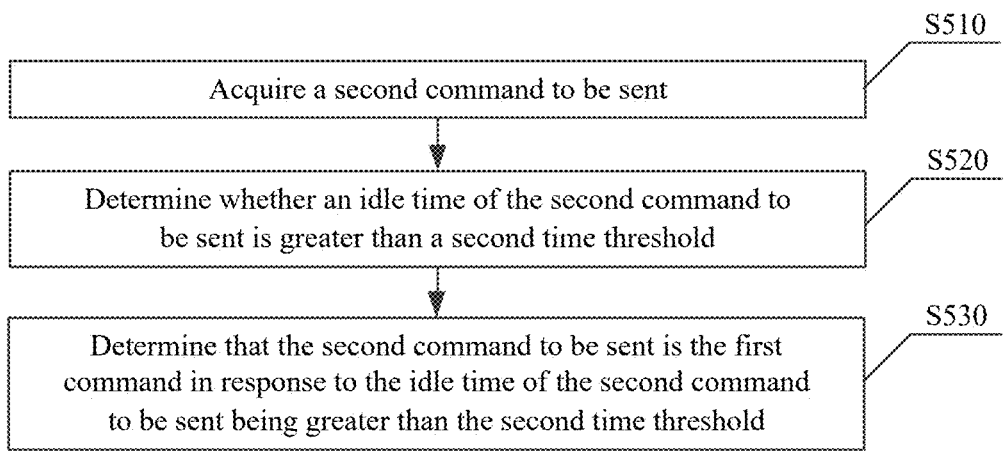
FIG. 5 is a schematic flow diagram of a method for determining a first command according to an example of the present disclosure.

FIG. 5 is a schematic flow diagram of a method for determining the first command according to an example of the present disclosure. As shown, the method for determining the first command may comprise the following operations. It is applicable to the memory controller shown in FIG. 1A.

The control method of an example of the present disclosure may comprise S510. In S510, a second command to be sent is acquired.

As described above, the memory controller collects the generated memory device-oriented commands into the command pool to be sent, and arranges an order of transmitting the commands in accordance with factors such as a preset timing, priorities, and bus utilization.

In the example of the present disclosure, the memory controller acquires the second command to be sent from the command pool to be sent, and transmits the second command to be sent using the bus. The second command to be sent may be any command in the command pool.

The control method of an example of the present disclosure may comprise S520. In S520, whether idle time of the second command to be sent is greater than a second time threshold is determined.

In the example of the present disclosure, whether the second command to be sent is the first command into which a command can be inserted is determined according to a duration of the idle time of the second command to be sent. In an example, the duration of the idle time corresponding to the second command to be sent is determined according to a command type of the second command to be sent. Accordingly, whether the idle time of the second command to be sent is greater than the preset second time threshold is determined. The second time threshold is a time threshold set according to actual product requirements of the memory controller.

In the examples, the second time threshold is set to 100 ns.

The control method of the example of the present disclosure may comprise S530. In S530, it is determined that the second command to be sent is the first command in response to the idle time of the second command to be sent being greater than the second time threshold.

In the example of the present disclosure, it is determined that the second command to be sent is the first command in response to the idle time of the second command to be sent being greater than the second time threshold. Since the idle time of the second command to be sent is greater than the second time threshold, the idle time may be used for inserting transmission of other commands, without affecting the sending of the second command to be sent. In this regard, after it is determined that the second command to be sent is the first command, a corresponding second command may be selected from the command pool to be sent according to any of the above examples.

In the control method of the example of the present disclosure, the first command may be determined based on the idle time of the command to be sent. In an example, the idle time of the first command comprises the change column setup time tCCS. As stipulated by the ONFI protocol, the change column setup time tCCS is required to be included in idle time of a variety of commands of different command types, such as a change read column command, and a change write column command. Since a duration of the change column setup time tCCS is long, typically more than 200 ns, the transmission of other commands may be inserted into that time. In this regard, whether the idle time of the command to be sent comprises the change column setup time tCCS may be determined according to the command type of the command to be sent, thereby determining that the command to be sent serves as the first command. Determining the first command through the command type of the command to be sent may save a process of comparing the idle time of the command to be sent with the second time threshold as described above, so that the first command into which a command can be inserted may be determined more efficiently.

In the control method provided by the example of the present disclosure, the first command may be determined based on the duration of the idle time of the command to be sent or through the command type of the command to be sent. A variety of implementations for determining the first command are provided for different application scenarios. Through the above method, a suitable command to be sent may be selected as the first command, and the idle time of the first command is used for sending other commands, thereby improving the overall transmission efficiency of the bus.

In the control method of the example of the present disclosure, the first command corresponds to a first enable (Chip Enable (CE)); and the second command corresponds to a second enable. The first enable and the second enable are different types of enable.

In the memory system, the memory device typically comprises a plurality of memory chips. The control command sent by the memory controller to the memory device comprises the enable signal, by which a corresponding logic cell is gated, that is, a target logic cell of the control command is selected. Accordingly, the first command corresponds to the first enable, so as to determine a first target logic cell corresponding to the first command. Since the transmission of the second command is inserted into the idle time of the first command, that is, the transmission of the second command is performed during execution of the first command, the second command should correspond to the second enable that is different from the first enable, i.e., correspond to a second target logic cell that is different from the first target logic cell, so as avoid disturbance during execution of the command.

In the examples, the first enable and the second enable corresponding to the first command and the second command correspond to different memory chips respectively. The different memory chips are located in the same physical channel. In the memory system, the physical channel is typically a group of parallel data lines. Different memory chips located in the physical channel are gated through different types of enable on the physical channel.

Figure 6:
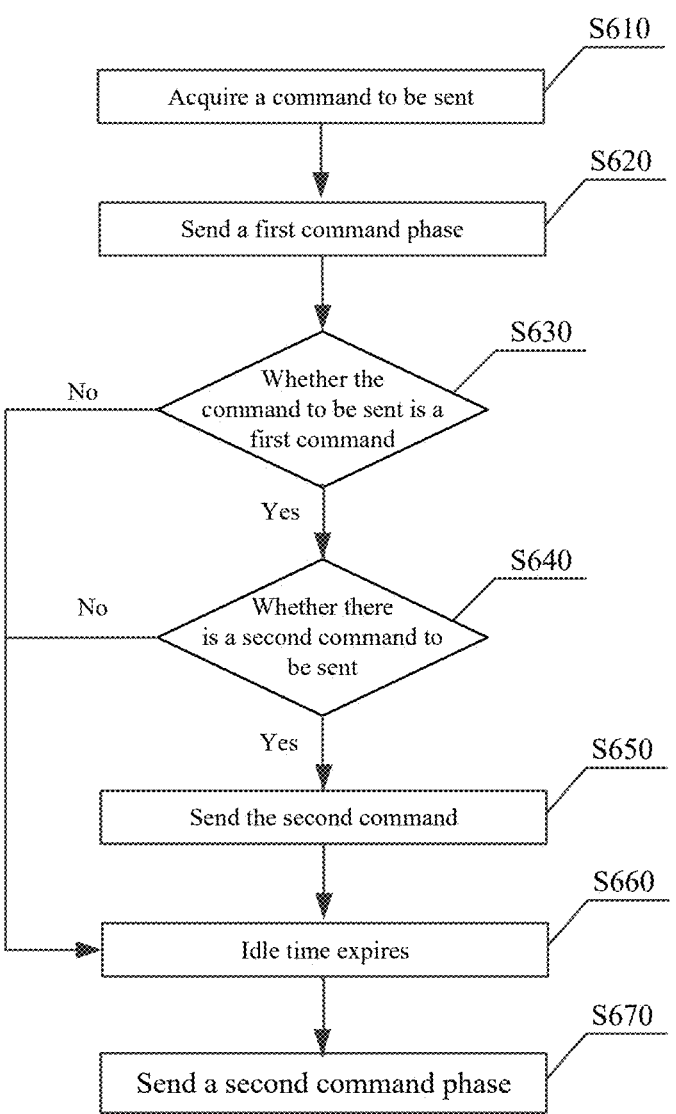
FIG. 6 is a schematic flow diagram of a command sending process according to an example of the present disclosure.

FIG. 6 is a schematic flow diagram of a command sending process according to an example of the present disclosure. As shown, the control method of the memory system provided in the example of the present disclosure may comprise the following operations. It is applicable to the memory controller shown in FIG. 1A.

In S610, a command to be sent is acquired.

In the example of the present disclosure, the memory controller acquires the command to be sent from a command pool to be sent, and transmits the command to be sent using the bus. The command to be sent may be any command in the command pool.

In S620, a first command phase of the command to be sent is sent.

In the example of the present disclosure, as stipulated by the ONFI protocol, the first command phase of the command to be sent is sent first.

In S630, whether the command to be sent is the first command is determined.

In the example of the present disclosure, whether the command to be sent is the first command is determined according to the technical solution introduced in the above examples, i.e., whether other commands can be inserted in idle time of the command to be sent.

If the command to be sent is the first command, operation S640 is performed.

If the command to be sent is not the first command, operation S660 is performed.

In S640, whether there is a second command to be sent is determined in response to the command to be sent being the first command.

In the example of the present disclosure, whether there is a second command to be sent in the command pool to be sent is further determined in response to the command to be sent being the first command. The method for determining the second command may be referred to the technical solution introduced in the above examples, which is no longer repeated here.

If there is a second command to be sent in the command pool to be sent, operation S650 is performed.

If there is no second command to be sent in the command pool to be sent, operation S660 is performed.

In S650, in response to the presence of the second command to be sent, the second command is sent.

In the example of the present disclosure, if there is the second command to be sent in the command pool to be sent, the second command is sent in the idle time of the first command.

In S660, idle time of the command to be sent expires.

In the example of the present disclosure, regardless of whether the second command is sent in the idle time of the command to be sent, operation S670 is performed when the idle time of the command to be sent expires.

In S670, a second command phase of the command to be sent is sent.

In the example of the present disclosure, as stipulated by the ONFI protocol, the second command phase of the command to be sent is sent when the idle time of the command to be sent expires.

Based on the same inventive concept, examples of the present disclosure further provide a memory system, which is described as the following example. Since a problem solving principle of the example of the memory system is similar to that of the above example of a garbage collection method, an implementation of the example of the memory system may be referred to an implementation of the above method example, and is no longer repeated here.

FIG. 1A is a schematic diagram of an example system having a memory system according to an example of the present disclosure. The memory system 100 may be a mobile phone, a desktop computer, a laptop computer, a tablet computer, a vehicle computer, a gaming console, a printer, a positioning device, a wearable electronic device, a smart sensor, a virtual reality (VR) device, an augmented reality (AR) device, or any other suitable electronic devices having storage therein. With reference to FIG. 1A, the memory system 100 comprises: one or more of the memory devices 104 as described in the above examples; and the memory controller 106 coupled to the memory device 104 and configured to:

send a first command phase of a first command, wherein the first command comprises the first command phase and a second command phase with an idle time provided between the first command phase and the second command phase;

send a second command in the idle time of the first command; and send the second command phase of the first command when the idle time of the first command expires.

In the example of the present disclosure, the memory controller 106 is further configured such that a command occupancy time corresponding to the second command is less than the idle time of the first command.

In the example of the present disclosure, the memory controller 106 is further configured to: acquire a first command to be sent; determine whether a command occupancy time of the first command to be sent is less than a first time threshold, wherein the first time threshold is less than or equal to the idle time of the first command; and determine that the first command to be sent is the second command in response to the command occupancy time of the first command to be sent being less than the first time threshold.

In the example of the present disclosure, the second command is a status read command.

In the example of the present disclosure, the memory controller 106 is further configured to: send a third command in the idle time of the first command, wherein a sum of a command occupancy time corresponding to the second command and a command occupancy time corresponding to the third command is less than the idle time of the first command.

In the example of the present disclosure, the memory controller 106 is further configured to: start timing upon completion of sending the first command phase of the first command; send the second command during the timing; and send the second command phase of the first command when time of the timing reaches the idle time of the first command.

In the example of the present disclosure, the memory controller 106 is further configured to: acquire a second command to be sent; determine whether an idle time of the second command to be sent is greater than a second time threshold; and determine that the second command to be sent is the first command in response to the idle time of the second command to be sent being greater than the second time threshold.

In the example of the present disclosure, the memory controller 106 is further configured such that the idle time of the first command comprises a change column setup time of the first command.

In the example of the present disclosure, the memory controller 106 is further configured such that the first command corresponds to a first enable; and the second command corresponds to a second enable.

In the example of the present disclosure, the memory controller 106 is further configured such that the first enable and the second enable respectively correspond to memory chips located on the same physical channel.

Based on the same inventive concept, examples of the present disclosure further provide a memory controller, which is described as the following example. Since a problem solving principle of the example of the memory controller is similar to that of the above example of a garbage collection method, an implementation of the example of the memory controller may be referred to an implementation of the above method example, and is no longer repeated here.

FIG. 1A is a schematic diagram of an example system having a memory system according to an example of the present disclosure. With reference to FIG. 1A, the memory system 100 comprises: one or more of the memory devices 104 as described in the above examples; and the memory controller 106 coupled to the memory device 104. The memory controller 106 comprises: a controller memory configured to store a control instruction; and a controller processor coupled to the controller memory and configured to execute the control instruction to perform processing comprising:

sending a first command phase of a first command, wherein the first command comprises the first command phase and a second command phase with an idle time provided between the first command phase and the second command phase;

sending a second command in the idle time of the first command; and sending the second command phase of the first command when the idle time of the first command expires.

In the example of the present disclosure, a command occupancy time corresponding to the second command is less than the idle time of the first command.

In the example of the present disclosure, the processing further comprises: acquiring a first command to be sent; determining whether the command occupancy time of the first command to be sent is less than a first time threshold, wherein the first time threshold is less than or equal to the idle time of the first command; and determining that the first command to be sent is the second command in response to the command occupancy time of the first command to be sent being less than the first time threshold.

In the example of the present disclosure, the second command is a status read command.

In the example of the present disclosure, the processing further comprises: sending a third command in the idle time of the first command, wherein a sum of a command occupancy time corresponding to the second command and a command occupancy time corresponding to the third command is less than the idle time of the first command.

In the example of the present disclosure, the processing further comprises: starting timing upon completion of sending the first command phase of the first command; sending the second command during the timing; and sending the second command phase of the first command when time of the timing reaches the idle time of the first command.

In the example of the present disclosure, the processing further comprises: acquiring a second command to be sent; determining whether an idle time of the second command to be sent is greater than a second time threshold; and determining that the second command to be sent is the first command in response to the idle time of the second command to be sent being greater than the second time threshold.

In the example of the present disclosure, the idle time of the first command comprises a change column setup time of the first command.

In the example of the present disclosure, the first command corresponds to a first enable; and the second command corresponds to a second enable.

In the example of the present disclosure, the first enable and the second enable respectively correspond to memory chips located on the same physical channel.

In the examples, a computer readable storage medium comprising an instruction is also provided, e.g., a controller memory comprising an instruction, wherein the instruction is executable by the controller processor of the memory controller to implement the above method. In an example, the computer readable storage medium may be a ROM, a random access memory (RAM), a CD-ROM, a magnetic tape, a floppy disk, and an optical data storage device, etc.

In the examples, a computer program product comprising a computer program/instruction is also provided, wherein the computer program/instruction, when executed by a processor, implements the method in the above examples.

Examples of the present disclosure provide a memory system, a memory controller, a control method, and a storage medium.

According to an aspect of examples of the present disclosure, a memory system is provided, comprising: a memory device comprising a memory chip; and a memory controller coupled to the memory device and configured to: send a first command phase of a first command, wherein the first command comprises the first command phase and a second command phase, with an idle time provided between the first command phase and the second command phase; send a second command in the idle time of the first command; and send the second command phase of the first command when the idle time of the first command expires.

In some examples of the present disclosure, a command occupancy time corresponding to the second command is less than the idle time of the first command.

In some examples of the present disclosure, the memory controller is further configured to: acquire a first command to be sent; determine whether a command occupancy time of the first command to be sent is less than a first time threshold, wherein the first time threshold is less than or equal to the idle time of the first command; and determine that the first command to be sent is the second command in response to the command occupancy time of the first command to be sent being less than the first time threshold.

In some examples of the present disclosure, the second command is a status read command.

In some examples of the present disclosure, the memory controller is further configured to: send a third command in the idle time of the first command, wherein a sum of a command occupancy time corresponding to the second command and a command occupancy time corresponding to the third command is less than the idle time of the first command.

In some examples of the present disclosure, the memory controller is further configured to: start timing upon completion of sending the first command phase of the first command; send the second command during the timing; and send the second command phase of the first command when time of the timing reaches the idle time of the first command.

In some examples of the present disclosure, the memory controller is further configured to: acquire a second command to be sent; determine whether an idle time of the second command to be sent is greater than a second time threshold; and determine that the second command to be sent is the first command in response to the idle time of the second command to be sent being greater than the second time threshold.

In some examples of the present disclosure, the idle time of the first command comprises a change column setup time of the first command.

In some examples of the present disclosure, the first command corresponds to a first enable; and the second command corresponds to a second enable.

In some examples of the present disclosure, the first enable and the second enable respectively correspond to memory chips located on the same physical channel.

According to another aspect of examples of the present disclosure, a memory controller is provided, comprising: a controller memory configured to store a control instruction; and a controller processor coupled to the controller memory and configured to execute the control instruction to perform processing comprising: sending a first command phase of a first command, wherein the first command comprises the first command phase and a second command phase with an idle time provided between the first command phase and the second command phase; sending a second command in the idle time of the first command; and sending the second command phase of the first command when the idle time of the first command expires.

In some examples of the present disclosure, a command occupancy time corresponding to the second command is less than the idle time of the first command.

In some examples of the present disclosure, the processing further comprises: acquiring a first command to be sent; determining whether a command occupancy time of the first command to be sent is less than a first time threshold, wherein the first time threshold is less than or equal to the idle time of the first command; and determining that the first command to be sent is the second command in response to the command occupancy time of the first command to be sent being less than the first time threshold.

In some examples of the present disclosure, the second command is a status read command.

In some examples of the present disclosure, the processing further comprises: sending a third command in the idle time of the first command, wherein a sum of a command occupancy time corresponding to the second command and a command occupancy time corresponding to the third command is less than the idle time of the first command.

In some examples of the present disclosure, the processing further comprises: starting timing upon completion of sending the first command phase of the first command; sending the second command during the timing; and sending the second command phase of the first command when time of the timing reaches the idle time of the first command.

In some examples of the present disclosure, the processing further comprises: acquiring a second command to be sent; determining whether an idle time of the second command to be sent is greater than a second time threshold; and determining that the second command to be sent is the first command in response to the idle time of the second command to be sent being greater than the second time threshold.

In some examples of the present disclosure, the idle time of the first command comprises a change column setup time of the first command.

In some examples of the present disclosure, the first command corresponds to a first enable; and the second command corresponds to a second enable.

In some examples of the present disclosure, the first enable and the second enable respectively correspond to memory chips located on the same physical channel.

According to still another aspect of examples of the present disclosure, a control method of a memory system is provided, comprising: sending a first command phase of a first command, wherein the first command comprises the first command phase and a second command phase with an idle time provided between the first command phase and the second command phase; sending a second command in the idle time of the first command; and sending the second command phase of the first command when the idle time of the first command expires.

In some examples of the present disclosure, a command occupancy time corresponding to the second command is less than the idle time of the first command.

In some examples of the present disclosure, the control method further comprises: acquiring a first command to be sent; determining whether a command occupancy time of the first command to be sent is less than a first time threshold, wherein the first time threshold is less than or equal to the idle time of the first command; and determining that the first command to be sent is the second command in response to the command occupancy time of the first command to be sent being less than the first time threshold.

In some examples of the present disclosure, the second command is a status read command.

In some examples of the present disclosure, a third command is sent in the idle time of the first command, wherein a sum of a command occupancy time corresponding to the second command and a command occupancy time corresponding to the third command is less than the idle time of the first command.

In some examples of the present disclosure, sending a second command in the idle time of the first command comprises: starting timing upon completion of sending the first command phase of the first command; sending the second command during the timing; and sending the second command phase of the first command when time of the timing reaches the idle time of the first command.

In some examples of the present disclosure, a second command to be sent is acquired; whether an idle time of the second command to be sent is greater than a second time threshold is determined; and the second command to be sent is the first command is determined in response to the idle time of the second command to be sent being greater than the second time threshold.

In some examples of the present disclosure, the idle time of the first command comprises a change column setup time of the first command.

In some examples of the present disclosure, the first command corresponds to first enable; and the second command corresponds to a second enable.

In some examples of the present disclosure, the first enable and the second enable respectively correspond to memory chips located on the same physical channel.

According to yet still another aspect of the examples of the present disclosure, a computer readable storage medium is provided, wherein control instructions in the computer readable storage medium, when executed by a controller processor, enable the controller processor to perform the control method described in any one of the above examples.

Examples of the present disclosure provide the memory system, the memory controller, and the control method, wherein the first command phase of the first command is sent, the second command is sent in the idle time of the first command, and the second command phase of the first command is sent when the idle time of the first command expires. In the method, the idle time between the first command phase and the second command phase is used for sending the second command, thereby improving a transmission efficiency of a bus while ensuring a normal transmission of the first command.

It is to be understood that, reference throughout the specification to "some examples" means that particular features, structures, or characteristics related to the examples are included in at least one example of the present disclosure. Thus, the appearances of the phrase "in some examples" or "in some other examples" in various places throughout this specification are not necessarily referring to the same example. In addition, these specific features, structures or characteristics may be combined in one or more examples in any proper manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are used for description only, and do not represent goodness and badness of the examples.

It is to be noted that, the terms "include", "comprise", or any variants thereof herein are intended to cover non-exclusive inclusion, such that a process, a method, an article, or a device comprising a series of elements comprise not only those elements, but also other elements not listed explicitly, or elements inherent to this process, method, article, or device. An element defined by a statement "comprising one" do not preclude the presence of another identical element in the process, method, article or device comprising this element, without more limitations.

In several examples provided by the present disclosure, it is to be understood that the disclosed device and method may be implemented in other manners. The device examples described above are illustrative only, for example, the division of units is merely a logical functional division. In a real implementation, there may be another manner for division. For instance, a plurality of units or components may be combined, or may be integrated in another system, or some features may be ignored or not performed. In addition, the coupling or direct coupling or communication connection between various constituent parts as shown or as discussed may be implemented through indirect coupling or communication connection of some interfaces, devices or units, and may be electrical, mechanical or in other forms.

The above-mentioned units described as separate components may or may not be physically separated. The components shown as units may or may not be physical units. They may be located in one place, or may be distributed onto a plurality of network units. According to actual needs, part or all of the units may be selected for realizing the purposes of the solution of the example.

In addition, various functional units in each example of the present disclosure may be all integrated into one processing unit, or each unit may serve as one unit individually, or two or more units may be integrated into one unit. The above-mentioned integrated unit may be implemented in a hardware form or in a form of hardware and software functional units.

The above descriptions are merely example implementations of the present disclosure, and the scope of protection of the present disclosure is not limited thereby. Any variations or replacements readily conceivable to a person familiar with the existing technology within the technical scope disclosed by the present disclosure shall fall within the scope of protection of the present disclosure. Therefore, the protection scope of the present disclosure shall be defined by the protection scope of the claims.

What is claimed is:

1. A memory system, comprising:
a memory device including a memory chip; and
a memory controller coupled to the memory device and configured to:
    send a first command phase of a first command, wherein the first command includes the first command phase and a second command phase with an idle time provided between the first command phase and the second command phase, and wherein the first command phase and the second command phase are consecutive command phases;
    send a second command in the idle time of the first command, wherein, in the idle time of the first command, the first command phase has terminated and the second command phase has not begun; and
    send the second command phase of the first command when the idle time of the first command expires.

2. The memory system of claim 1, wherein a command occupancy time corresponding to the second command is less than the idle time of the first command.

3. The memory system of claim 1, wherein the memory controller is further configured to:
acquire the first command;
determine whether a command occupancy time of the first command is less than a first time threshold, wherein the first time threshold is less than or equal to the idle time of the first command; and
determine that the first command is the second command, in response to the command occupancy time of the first command being less than the first time threshold.

4. The memory system of claim 1, wherein the second command is a status read command.

5. The memory system of claim 1, wherein the memory controller is further configured to send a third command in the idle time of the first command, wherein a sum of a command occupancy time corresponding to the second command and a command occupancy time corresponding to the third command is less than the idle time of the first command.

6. The memory system of claim 1, wherein the memory controller is further configured to:
start timing upon completion of sending the first command phase of the first command;
send the second command during the timing; and
send the second command phase of the first command when the timing reaches the idle time of the first command.

7. The memory system of claim 1, wherein the memory controller is further configured to:
acquire the second command;
determine whether an idle time of the second command is greater than a second time threshold; and determine that the second command is the first command, in response to the idle time of the second command being greater than the second time threshold.

8. The memory system of claim 1, wherein the idle time of the first command includes a change column setup time of the first command.

9. The memory system of claim 1, wherein the first command corresponds to a first enable, and the second command corresponds to a second enable.

10. The memory system of claim 9, wherein the first enable and the second enable respectively correspond to memory chips located on a same physical channel.

11. A control method of a memory system, comprising:
sending a first command phase of a first command, wherein the first command includes the first command phase and a second command phase with an idle time provided between the first command phase and the second command phase, and wherein the first command phase and the second command phase are consecutive command phases;
sending a second command in the idle time of the first command, wherein, in the idle time of the first command, the first command phase has terminated and the second command phase has not begun; and
sending the second command phase of the first command when the idle time of the first command expires.

12. The control method of claim 11, wherein a command occupancy time corresponding to the second command is less than the idle time of the first command.

13. The control method of claim 12, further including:
acquiring the first command;
determining whether a command occupancy time of the first command is less than a first time threshold, wherein the first time threshold is less than or equal to the idle time of the first command; and
determining that the first command is the second command, in response to the command occupancy time of the first command being less than the first time threshold.

14. The control method of claim 11, wherein the second command is a status read command.

15. The control method of claim 11, further including sending a third command in the idle time of the first command, wherein a sum of a command occupancy time corresponding to the second command and a command occupancy time corresponding to the third command is less than the idle time of the first command.

16. The control method of claim 11, wherein the sending the second command in the idle time of the first command includes:
starting timing upon completion of sending the first command phase of the first command;
sending the second command during the timing; and
sending the second command phase of the first command when the timing reaches the idle time of the first command.

17. The control method of claim 11, further including:
acquiring the second command;
determining whether an idle time of the second command is greater than a second time threshold; and
determining that the second command is the first command, in response to the idle time of the second command being greater than the second time threshold.

18. The control method of claim 11, wherein the idle time of the first command includes a change column setup time of the first command.

19. The control method of claim 11, wherein the first command corresponds to a first enable, the second command corresponds to a second enable.

20. A non-transitory computer readable storage medium, wherein control instructions in the non-transitory computer readable storage medium, when executed by at least one processor, enable the at least one processor to perform a control method of a memory system, the control method comprising:

sending a first command phase of a first command, wherein the first command includes the first command phase and a second command phase with an idle time provided between the first command phase and the second command phase, and wherein the first command phase and the second command phase are consecutive command phases;

sending a second command in the idle time of the first command, wherein, in the idle time of the first command, the first command phase has terminated and the second command phase has not begun; and sending the second command phase of the first command when the idle time of the first command expires.

\* \* \* \* \*